United States Patent
Raff et al.

(10) Patent No.: US 6,611,849 B1
(45) Date of Patent: Aug. 26, 2003

(54) SYSTEM FOR SYNCHRONIZING DATABASES ON MULTIPLE DEVICES UTILIZING A HOME BASE

(75) Inventors: Chris Raff, San Francisco, CA (US); Monty Boyer, Saratoga, CA (US)

(73) Assignee: Palm Source, Inc., Sunnyvale, CA (US)

( * ) Notice: Subject to any disclaimer, the term of this patent is extended or adjusted under 35 U.S.C. 154(b) by 168 days.

(21) Appl. No.: 09/675,576

(22) Filed: Sep. 29, 2000

(51) Int. Cl.⁷ .......................... G06F 12/00; G06F 17/30
(52) U.S. Cl. ........................ 707/203; 707/202
(58) Field of Search ............ 707/3, 203, 201, 707/8, 202, 101, 10

(56) References Cited

U.S. PATENT DOCUMENTS

| | | | |
|---|---|---|---|
| 5,684,990 A | | 11/1997 | Boothby .................. 395/619 |
| 5,727,202 A | * | 3/1998 | Kucala .................... 707/10 |
| 5,729,735 A | * | 3/1998 | Meyering ................. 707/10 |
| 5,884,325 A | | 3/1999 | Bauer et al. .............. 707/201 |
| 5,884,328 A | * | 3/1999 | Mosher, Jr. .............. 707/202 |
| 5,926,816 A | * | 7/1999 | Bauer et al. ............... 707/8 |
| 5,974,238 A | * | 10/1999 | Chase, Jr. ................ 709/248 |
| 5,978,813 A | * | 11/1999 | Foltz et al. .............. 707/201 |
| 5,991,771 A | * | 11/1999 | Falls et al. .............. 707/202 |
| 6,000,000 A | * | 12/1999 | Hawkins et al. .......... 707/201 |
| 6,192,365 B1 | * | 2/2001 | Draper et al. ............ 707/101 |
| 6,295,541 B1 | * | 9/2001 | Bodnar et al. ........... 707/203 |
| 6,330,568 B1 | * | 12/2001 | Boothby et al. .......... 707/201 |
| 6,374,262 B1 | * | 4/2002 | Kodama .................. 707/201 |

FOREIGN PATENT DOCUMENTS

| | | | |
|---|---|---|---|
| EP | 1 024 441 A2 | 8/2000 | ........... G06F/17/30 |
| WO | WO 00/48096 | 8/2000 | ........... G06F/17/30 |

OTHER PUBLICATIONS

Azzedine Boukerche, Sajal K. Das, Ajoy Datta, and Timothy E. LeMaster (1999), Implementation of a Virtual Time Synchronizer for Distributed Databases, pp. 1–5.*

Leslie Klieb (1996), Distributed disconnected databases, pp. 322–326.*

* cited by examiner

*Primary Examiner*—Safet Metjahic
*Assistant Examiner*—Merilyn Nguyen
(74) *Attorney, Agent, or Firm*—Wagner, Murabito & Hao LLP

(57) ABSTRACT

A system of synchronizing multiple devices utilizing a host system. In one embodiment, the present invention first synchronizes a first device with the host system. Next, the present invention synchronizes a second device with the host system. In so doing, the second device receives all changes which were entered directly into the host system, along with changes from the first device as of the last synchronization between the first device and the host system. If desired, the user may then synchronize the first device with the host system to get the changes from the second device. One embodiment of the present invention allows for any number of devices to be synchronized in this fashion, without having to connect the devices together for a single synchronization. Another embodiment of the present invention allows two devices to perform a pseudo-synchronization process. The pseudo-synchronization process allows the two devices to share recent changes with each other immediately, without the use of the host system.

23 Claims, 16 Drawing Sheets

SYSTEM FOR SYNCHRONIZING DATABASES ON MULTIPLE DEVICES UTILIZING A HOME BASE

FIELD OF THE INVENTION

The present invention relates to the field of data processing systems. Specifically, the present invention relates to a system for efficiently synchronizing information between multiple devices utilizing a central device.

RELATED ART

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

It has proven convenient to exchange data between a computer system and a palmtop computer using a communication interface, such as a serial or parallel input port. Alternatively, infrared (IR) or wireless radio frequency communication may be used for the interface.

It has also proven to be useful to have multiple devices which share common information. For example, a single user may have an address/phone book file on a palmtop (otherwise known as a personal digital assistant (PDA)), a desktop, and a phone. Alternatively, multiple users may have PDAs with related data sets. It is extremely useful for users to have a way to keep the information in specific corresponding files on each of multiple devices synchronized.

A number of programs today transfer data between PDAs and personal computer systems (PCs), but they are currently limited in functionality. For instance, some programs transfer all the information from the PDA to the PC without regard for the prior content on the PC. These programs assume that changes to that particular data are only made on the PDA, and that the changes made on the PDA take precedence over any changes made on the PC. As a result, any independent updates made directly on the PC will be lost.

Some conventional programs allow changes which were made on either a PC or a single PDA to be exchanged between the two computer systems. These programs assume that only two devices are involved and flag changed records on both devices. Consequently, these programs can do a relatively fast synchronization by simply exchanging flagged (modified) records, without doing a time-consuming comparison. However, these conventional programs do not provide a mechanism for synchronizing with three or more devices. Thus, the user is unable to accurately synchronize the phone files or a second PDA with those on the PC and the first PDA.

Other conventional programs perform a slower synchronization in which it is not assumed that the two devices being synchronized have an exclusive relationship. Thus, whatever change flags which do exist in the files cannot be trusted as being reliable. Therefore, these programs compare all records in the files in both devices with a third back-up file. The back-up file contains the result of the previous synchronization between these two devices. The comparison produces a fourth file, which is copied to both devices files, as well as to the back-up file. These synchronization programs work best with a high bandwidth connection between the two devices being synchronized. This is because large amounts of data are transferred back-and-forth because all records in each file must be compared. Consequently, the programs can be time consuming and also expensive if the user is paying for connection time on, for example a cellular phone link.

Still other conventional systems do not allow a mechanism for a device with limited memory to easily synchronize with other devices. This is because they require all changes from other devices to be sent to all devices, regardless of whether each device has enough memory to hold a large data files.

Some conventional systems locate virtually all synchronization related software on the host computer system. Therefore, they do not allow two peer devices, such as two PDAs, to perform synchronization-type operations directly.

SUMMARY OF THE INVENTION

Thus, a need has arisen for a system which allows multiple devices to be synchronized without connecting them all together at once. A further need has arisen for such a system which works efficiently with a bandwidth limited connection. A still further need has arisen for such a system when some of the devices have limited memory capacity. A still further need exists for a system which allows two devices to perform a synchronization-type operation without the use of a host computer system acting as an intermediary.

The present invention provides a system for allowing multiple devices to synchronize their files without the need for a single mass synchronization. The present invention works well in a bandwidth-limited environment. The present invention works well when one or more of the devices to be synchronized has limited memory capacity. The present invention also allows two devices to perform synchronization-type operations without the use of a host system. The present invention provides these advantages and others not specifically mentioned above but described in the sections to follow.

A system of synchronizing multiple devices utilizing a host system is disclosed. In one embodiment, the present invention first synchronizes a first device with the host system. Next, the present invention synchronizes a second device with the host system. In so doing, the second device receives all changes which were entered directly into the host system, along with changes from the first device as of the last synchronization between the first device and the host system. If desired, the user may then synchronize the first device with the host system to get the changes from the second device. One embodiment of the present invention allows for any number of devices to be synchronized in this fashion, without having to connect the devices together for a single synchronization. Another embodiment of the present invention allows two devices to perform a pseudo-synchronization process. The pseudo-synchronization process allows the two devices to share recent changes with each other immediately, without the use of the host system.

One embodiment of the present invention stores pending changes for each device in a transaction log on the host device. When each device synchronizes, its changes are stored in each of the other device's logs. Conversely, the contents of a device's own log are transferred to the device when it synchronizes with the host system. In this fashion, a fast synchronization is possible with each device treated as peers.

In the embodiment of the present invention using pseudo-synchronization, one device is treated as a primary device and all others as secondary. For example, the primary device may be a PDA and a secondary device may be a phone. In this fashion, the synchronization with the PDA is always a fast synchronization, while the synchronization with the phone is a slower process. This embodiment may be preferable when using a secondary device for which synchronization is done overnight over a high bandwidth/low cost connection. For example, a user may leave the phone charging overnight with the slower synchronization taking place during a portion of that time.

Still another embodiment of the present invention makes use of a backup file on the host device. Changed records from a device are sent to the backup file, which is reconciled with a corresponding file on the host device. This embodiment takes advantage of the fast processing speed of today's computers. By only sending changed records, as opposed to the entire file, connection time is saved, which is especially advantageous when using a wireless connection.

Yet another embodiment of the present invention allows the user to delete records on a device without having the deletions propagate throughout the network of devices. This can be very useful when using a memory-limited device, or a device in which the user simply does not wish to have a large database to search through.

DETAILED DESCRIPTION OF THE INVENTION

In the following detailed description of the present invention, a system for efficiently synchronizing information between multiple devices using a host system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EXEMPLARY PERSONAL DIGITAL ASSISTANT PLATFORM

Figure 1:
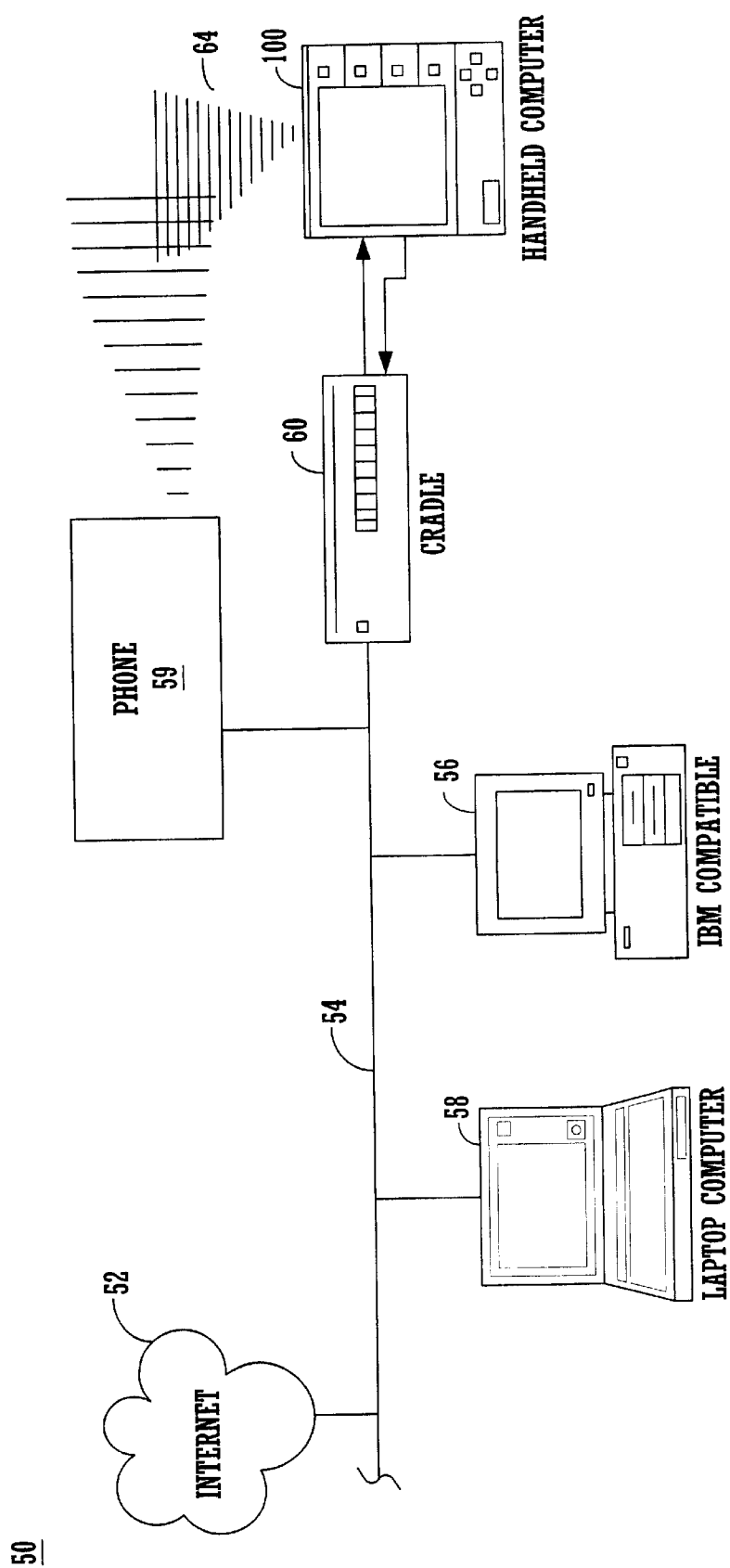
FIG. 1 is system illustration of a PDA computer system connected to other computer systems and the Internet via a cradle device.

FIG. 1 illustrates a system 50 that can be used in conjunction with various embodiments of the present invention.

It is appreciated that the present invention can operate with a variety of host computer and peripheral computer platforms and that system 50 is merely exemplary. System 50 comprises a host computer system 56 which can be a desktop unit as shown, a laptop system 58, or a web-server (not shown). Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a peripheral computer system, e.g., a palm top ("palm-sized") portable computer system 100. Cradle 60 provides an electrical and mechanical communication interface between bus 54 (and anything coupled to bus 54) and the computer system 100 for two way communications. Computer system 100 also contains a wireless infrared communication mechanism (IR) 64 for sending and receiving information from other devices. For example, phone 59 can communicate with computer system 100 over IR 64. Additionally, phone 59 may communicate via communication bus 54 with all devices.

Figure 2A:
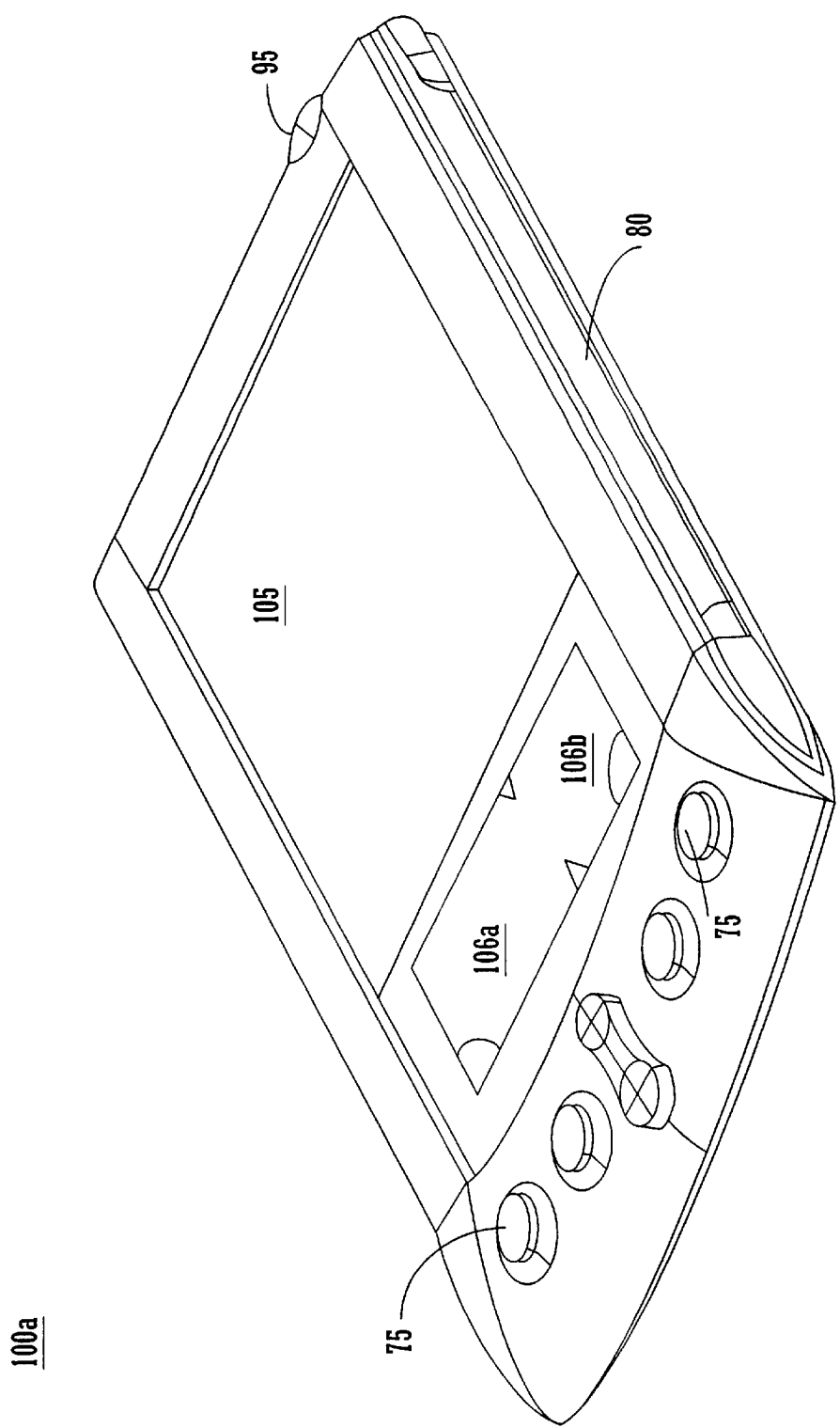
FIG. 2A is a top side perspective view of a PDA computer system that can be used as one of the devices to be synchronized, according to the present invention.

FIG. 2A is a perspective illustration of the top face 100*a* of one embodiment of the exemplary PDA computer system. The top face 110*a* contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100*a* also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106*a* and 106*b*. Region 106*a* is for the drawing of alphabetic characters therein (and not for numeric characters) for automatic recognition and region 106*b* is for the drawing of numeric characters therein (and not for alphabetic characters) for automatic recognition. The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 2B:
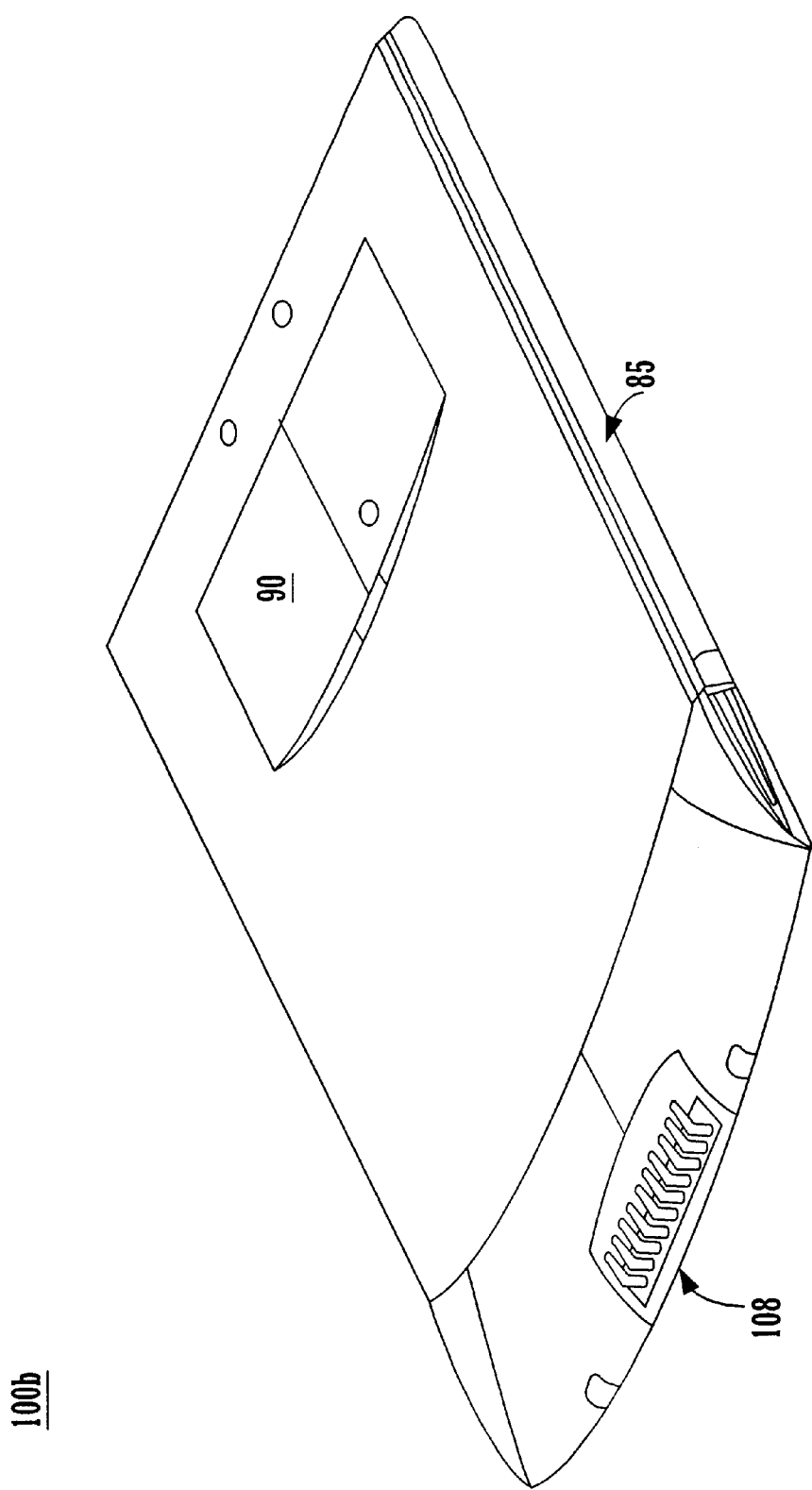
FIG. 2B is a bottom side perspective view of the PDA computer system of FIG. 2A.

FIG. 2B illustrates the bottom side 100*b* of one embodiment of the exemplary PDA computer system that can be used in accordance with various embodiments of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 3:
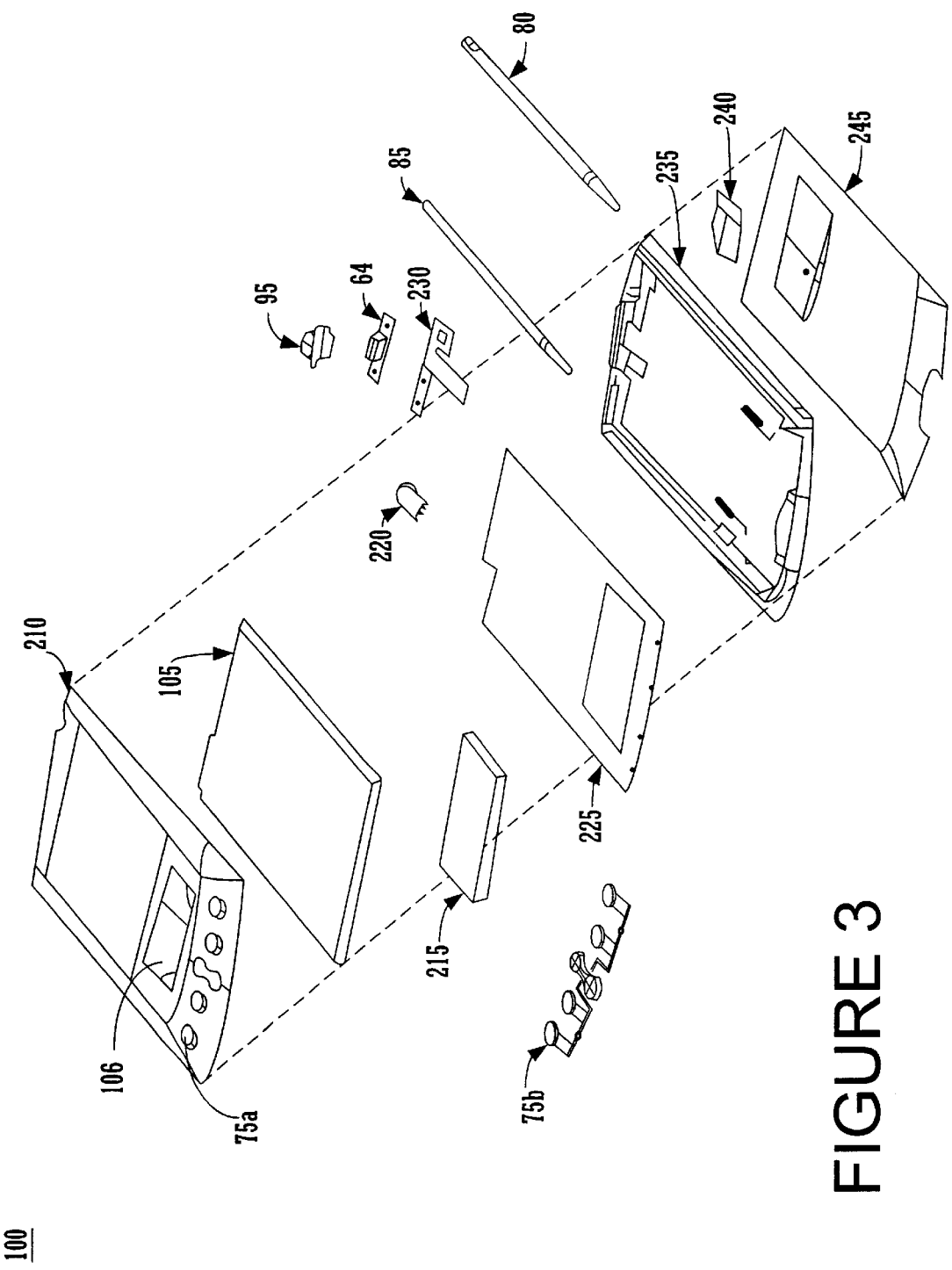
FIG. 3 is an exploded view of the components of the PDA computer system of FIG. 2A.

FIG. 3 is an exploded view of the exemplary PDA computer system 100 in accordance with one implementation. System 100 contains a front cover 210 having an outline of region 106 and holes 75*a* for receiving buttons 75*b*. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A mid-frame 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
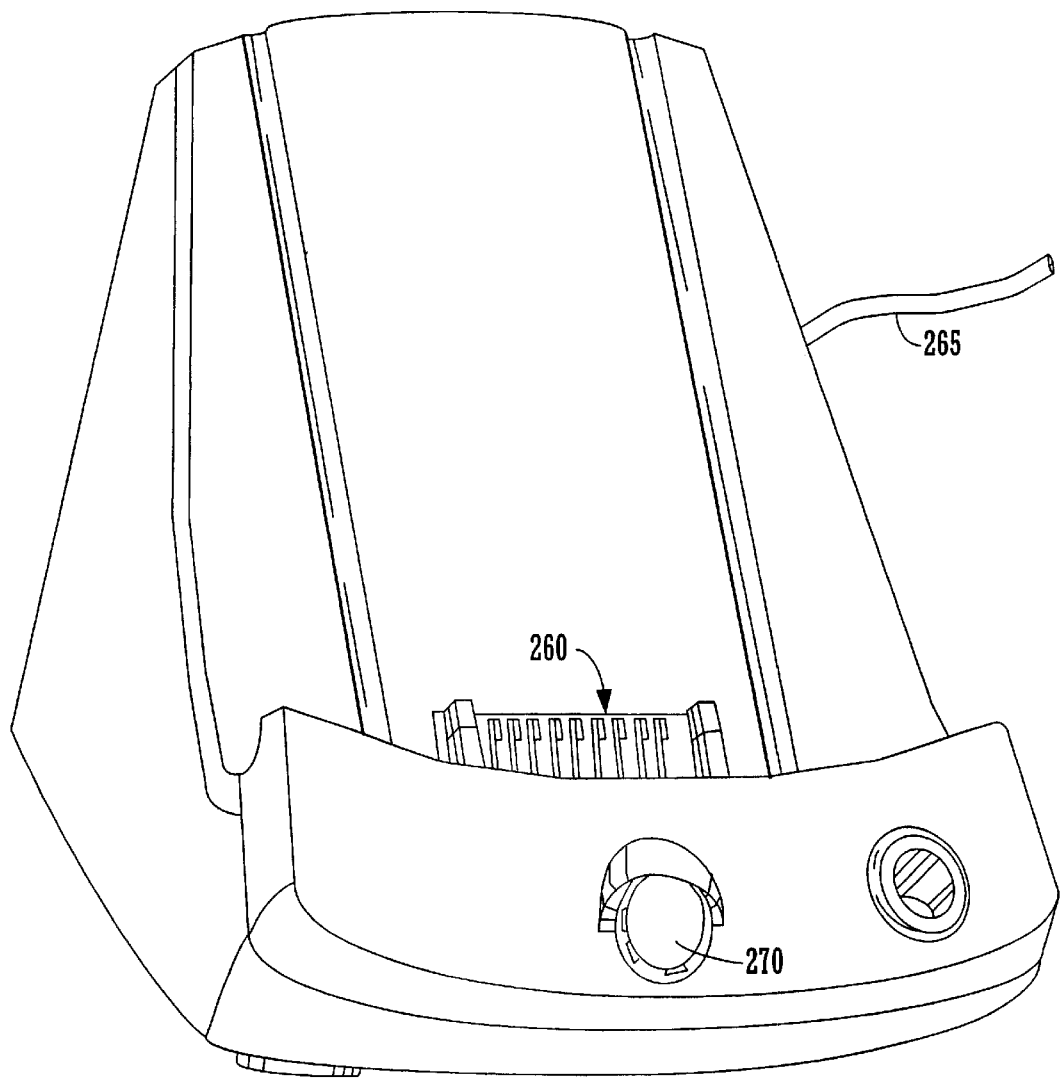
FIG. 4 is a perspective view of the cradle device for connecting the PDA computer system to other systems via a communication interface.

FIG. 4 is a perspective illustration of one embodiment of the cradle 60 for receiving the PDA computer system 100. Cradle 60 contains a mechanical and electrical interface 260 for interfacing with serial connection 108 (FIG. 1B) of computer system 100 when system 100 is slid into the cradle 60 in an upright position. Once inserted, button 270 can be pressed to initiate two way communication between system 100 and other computer systems coupled to serial communication 265.

Figure 5:
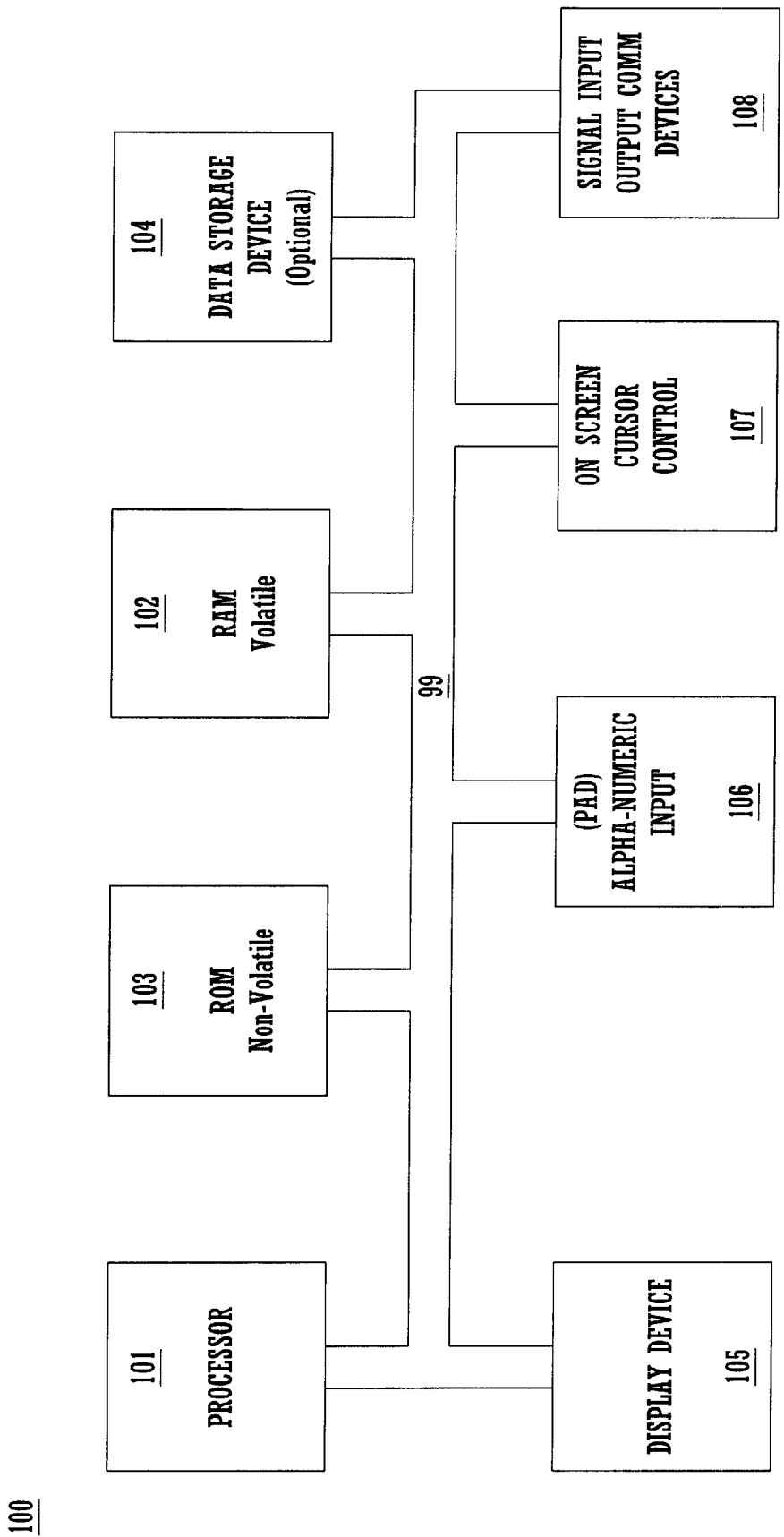
FIG. 5 is a logical block diagram of the PDA computer system in accordance with an embodiment of the present invention.

FIG. 5 illustrates circuitry of exemplary computer system 100, some of which can be implemented on PC board 225. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a nonvolatile memory 103 (e.g., read only memory ROM) coupled with the bus 99 for storing static information and instructions for the processor 101. Computer system 100 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in exemplary computer system 100 of FIG. 5 is an optional alphanumeric input device 106 which in one implementation is a handwriting recognition pad ("digitizer") having regions 106*a* and 106*b* (FIG. 1A), for instance. Device 106 can communicate information and command selections to the central processor 101. System 100 also includes an optional cursor control or directing device 107 coupled to the bus 99 for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 99, can be a serial port for communicating with the cradle 60. Device 108 can also include an infrared communication port.

Figure 6:
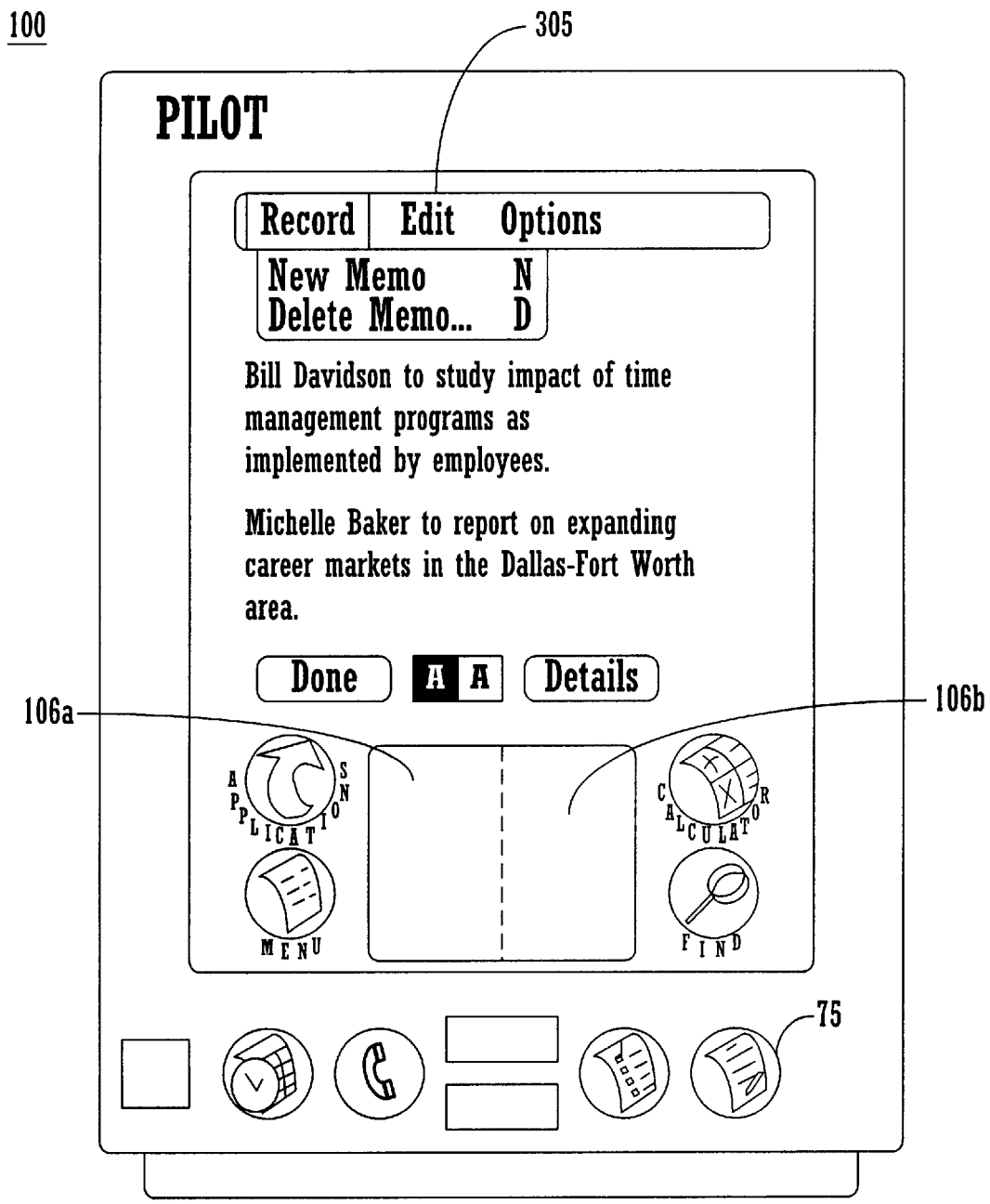
FIG. 6 is a front view of a PDA computer system illustrating the display screen, digitizer regions and an exemplary menu displayed on the display screen.

FIG. 6 is a front view of the exemplary PDA computer system 100 with a menu bar 305 open displaying a pull down window. Also shown are two regions of digitizer 106a and 106b. Region 106a is for receiving user stroke data for alphabet characters, and typically not numeric characters, and region 106b is for receiving user stroke data for numeric data, and typically not for alphabetic characters. Physical buttons 75 are also shown. Although different regions are shown for alphabetic and numeric characters, the present invention is also operable within a single region that recognizes both alphabetic and numeric characters.

SYSTEM FOR SYNCHRONIZATION OF DATABASES ON MULTIPLE DEVICES UTILIZING A HOME BASE

Figure 7A:
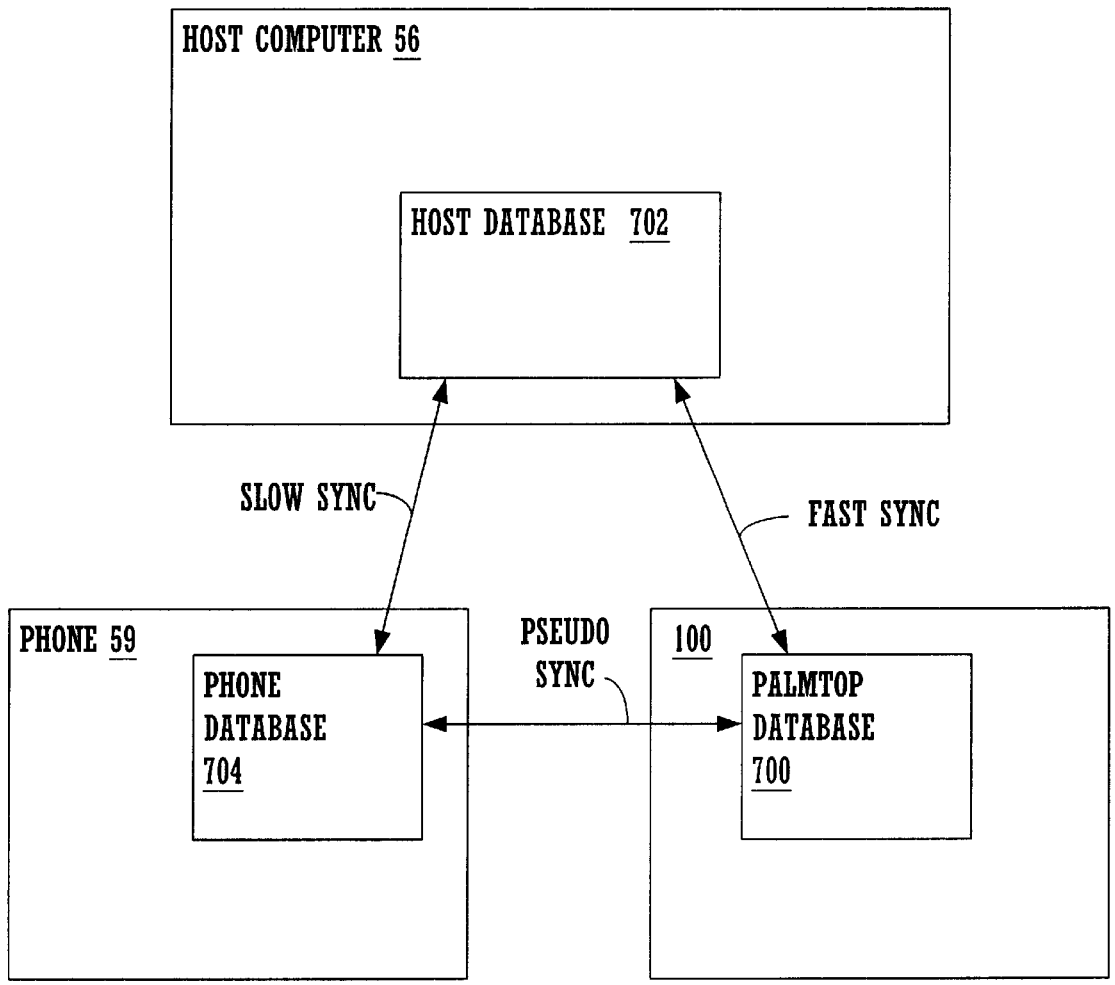
FIG. 7A is a block diagram showing the different types of synchronization in a multi-device environment according to one embodiment of the present invention.

FIG. 7A shows a block diagram of one embodiment of the present invention including a PDA computer system 100, a host computer 56, and a phone 59. Each device has a corresponding database (700, 702, 704) which contains data that the user may want to synchronize. While just one database per device is shown, the present invention is well-suited to synchronizing multiple corresponding databases. For example, the user may have a calendar database, an address database, an e-mail database, a memo database, and a to-do list database on each separate device. Furthermore, host computer system 56 may be a server, a web-based server, a desktop computer, a laptop computer, or the like. The system of FIG. 7A is particularly useful when a user has a host computer, a personal digital assistant (PDA), and one alternate portable device, such as a cellular phone or pager, etc.

The embodiment shown in FIG. 7A utilizes three different synchronization processes, depending upon which devices are synchronizing information. Each synchronization process involves only two devices. The present embodiment utilizes a fast-synchronization between the PDA 100 and the host system 56; a slow-synchronization between the phone 59 and the host system 56; and a pseudo-synchronization between the PDA 100 and the phone 59. The present embodiment is well-suited to using other devices in place of the phone 59 and the PDA 100. For example, the user could have two PDAs 100.

Referring still to FIG. 7A, a user may synchronize the phone 59 with the PDA 100 in two ways. A first way is a pseudo-synchronization between the PDA 100 and the phone 59. This technique does not require the host system 56. Briefly, this method uses change flags to identify which records need to be sent to the other device. Both devices send to the other device all records which have changed since the last time that device synchronized to the host system 56. If a device receives a duplicate of a record it already has, it ignores it. The change flags are not reset at the end of the process. Consequently, both devices may later update the host system 56 by synchronizing with it.

Alternatively, the user may first synchronize the PDA 100 to the host computer 56 and then synchronize the phone 59 with the host system 56. In this fashion, the phone 59 is now synchronized with the PDA 100. The latter method may be reversed, as well. The fast synchronization between the PDA 100 and the host system 56 uses change flags in both device's databases (700, 702). These flags indicate which records need to be transferred and compared. After the fast synchronization both device's flags are cleared. The slow synchronization between the phone 59 and the host system 56 compares all records in the corresponding databases (702, 704) on each device to determine the differences. The change flags are not used in this comparison because they are not reliable. This is because the host system's flags were reset after the fast synchronization with the PDA 100. However, the phone database 704 change flags are cleared after the synchronization.

Figure 7B:
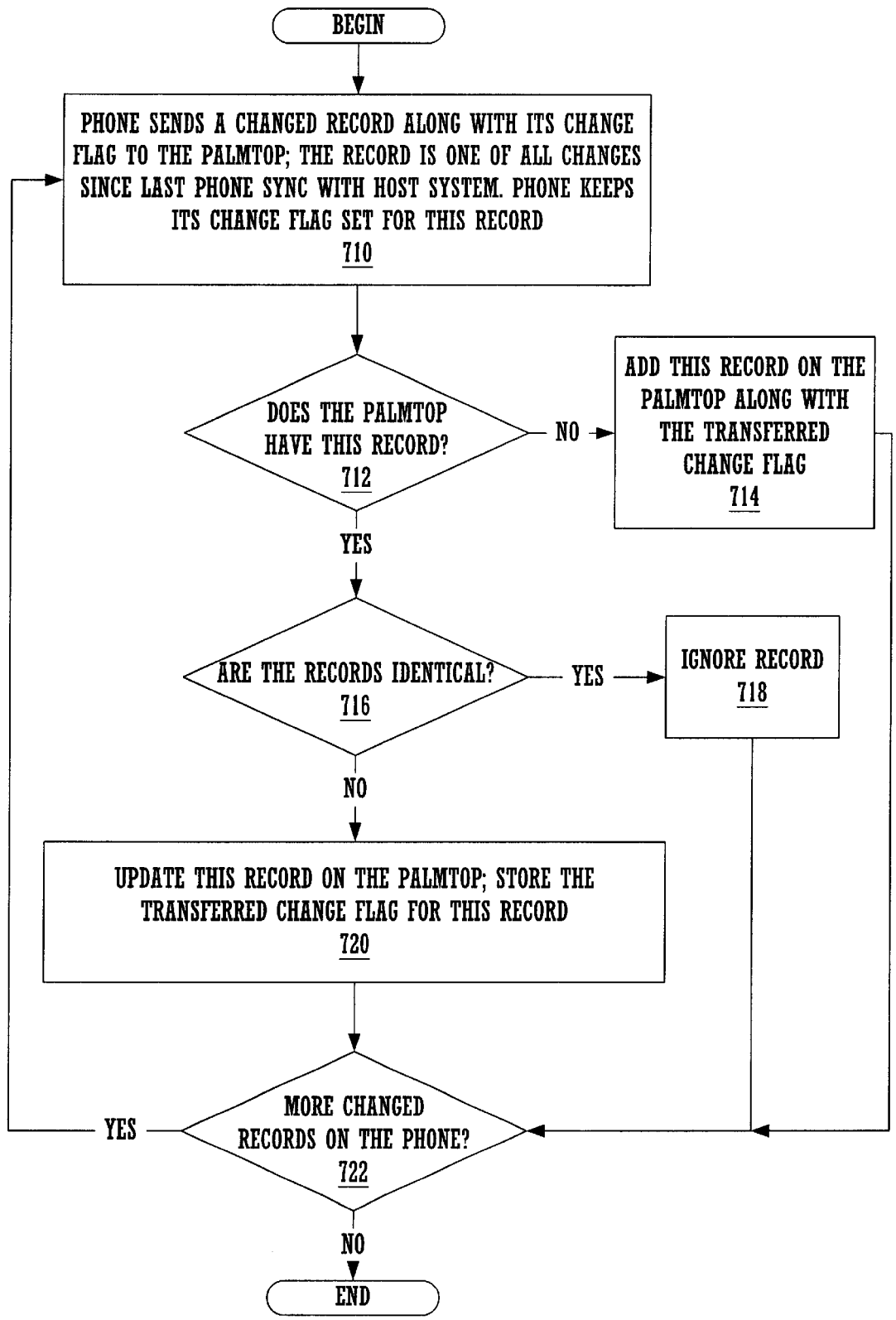
FIG. 7B is a flowchart of a pseudo-synchronization process according to one embodiment of the present invention.

Referring now to FIG. 7B, the steps performed by the present invention of pseudo-synchronizing the phone 59 with the PDA 100 will be described. In step 710, the phone 59 sends a changed record along with an associated change flag to the PDA 100. This flag indicates the record is new, modified, deleted, etc. This changed record is one which was changed since the last time the phone 59 synchronized with the host system 56. The phone 59 keeps the flag for this record set in its database 704. Therefore, when the phone synchronizes with the host system 56, these changes will be incorporated into the host database 702.

In step 712 of FIG. 7B, the PDA 100 determines whether it has a corresponding record in its database 700. If it does not, the PDA 100 adds the record to its database 700 and stores the transferred change flag. Thus, when the PDA 100 later synchronizes to the host system 56, this record can be incorporated into the host system database 702. After step 714, the PDA 100 determines whether the phone 59 has sent over more changed records, in step 722.

If the PDA 100 determines, in step 712 of FIG. 7B, that it does have the record which the phone 59 transferred, then the PDA determines, in step 716, whether the records are identical. If so, in step 718, the PDA 100 ignores the record and go on to step 722.

If, in step 716 of FIG. 7B, the PDA determines that the records are not identical, then it updates the record on its database 700. The PDA 100 also stores the transferred change flag for this record. Next, step 722 is performed to see if there are more records from the phone 59. While, FIG. 7B shows only the phone 59 sending its changed records to the PDA 100, it will be understood that the PDA 100 also sends its changed records to the phone 59 in an analogous fashion.

When synchronizing the phone 59 to the host system 56, the present embodiment uses a slow-synchronization process. Briefly, this process compares all records in both device's databases. Each record of the phone database 704 is compared with the records in a backup database (not shown) on the host system 56 to determine whether each record in the phone database 704 is new, updated or has been deleted from the phone database 704. Next, a comparison is made between each record in the host database 702 and the backup database on the host system 56 to determine whether each record in the host database 702 is new, updated or has been deleted from the host database 702. The results of both comparisons are stored in a reconcile database (not shown) on the host system 56. Finally, the contents of the reconcile database are transferred to the host database 702, the phone database 704, and the backup database. Change flags are not used to perform the synchronization. However, the phone database's 704 change flags are reset afterwards. Additionally, the host database's 702 flags are reset. This process is detailed in U.S. Pat. No. 5,727,202 entitled "Method and Apparatus for Synchronizing Multiple Files on Two Different Computer Systems", issued Mar. 10, 1998, which is hereby incorporated by reference.

Figure 7C:
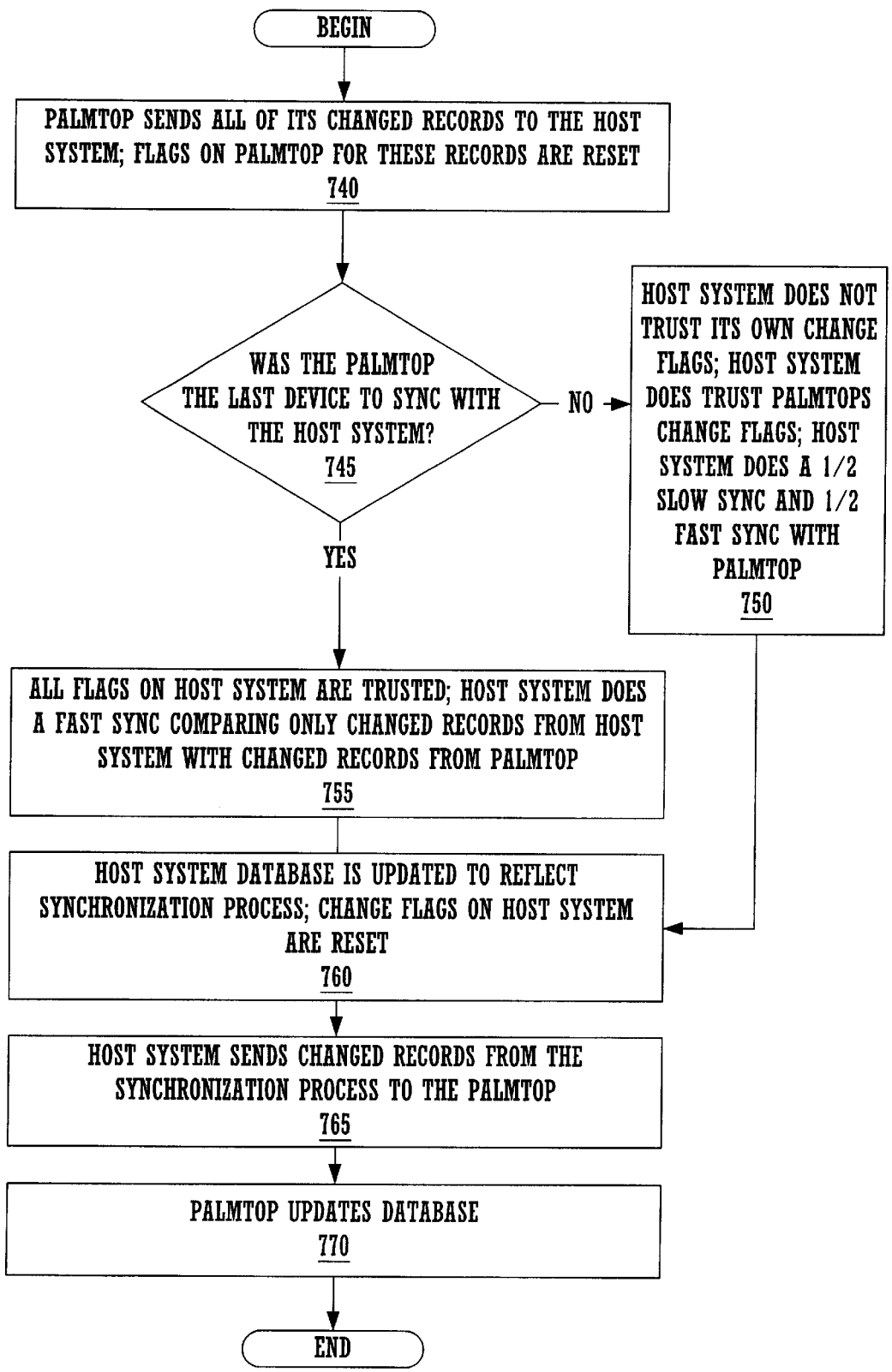
FIG. 7C is a flowchart of a fast synchronization between a PDA and a host system according to one embodiment of the present invention.

Referring now to FIG. 7C, the synchronization process between the PDA 100 and the host system 56 will be described. In step 740, the PDA 100 sends its changed records from PDA calendar database 700 to the host system 56. These records will be all records which were changed directly on the PDA 100 since the last time the PDA 100 synchronized with the host system 56, along with the indirect changes which the PDA 100 received from the phone 59 in the pseudo-synchronization process. In step 740, the PDA 100 also resets the flags in database 700 which identify these as changed records.

In step 745 of FIG. 7C, the host system 56 determines whether the PDA 100 was the last device to synchronize with the host system 56. If so, in step 755 the host trusts its change flags and performs a fast synchronization with the PDA 100. Details of one possible implementation of the fast synchronization process, along with a description of software, are described in U.S. Pat. No. 6,000,000, entitled "Extendible Method and Apparatus For Synchronizing Multiple Files On Two Different Computer Systems", issued Dec. 7, 1999, which is hereby incorporated by reference.

If the PDA 100 was not the last device to synchronize with the host system 56, then the host 56 does not trust its change flags to be accurate and it performs a combination of a fast-synchronization with slow-synchronization.

Next, after either step 750 or step 755, in step 760 of FIG. 7C, the host database 702 is updated to reflect the synchronization process. Furthermore the host system database 702 flags are reset. Next, in step 765, the host 56 sends the changed records which resulted from the synchronization process to the PDA 100, which updates its database 700 in step 770.

Figure 8A:
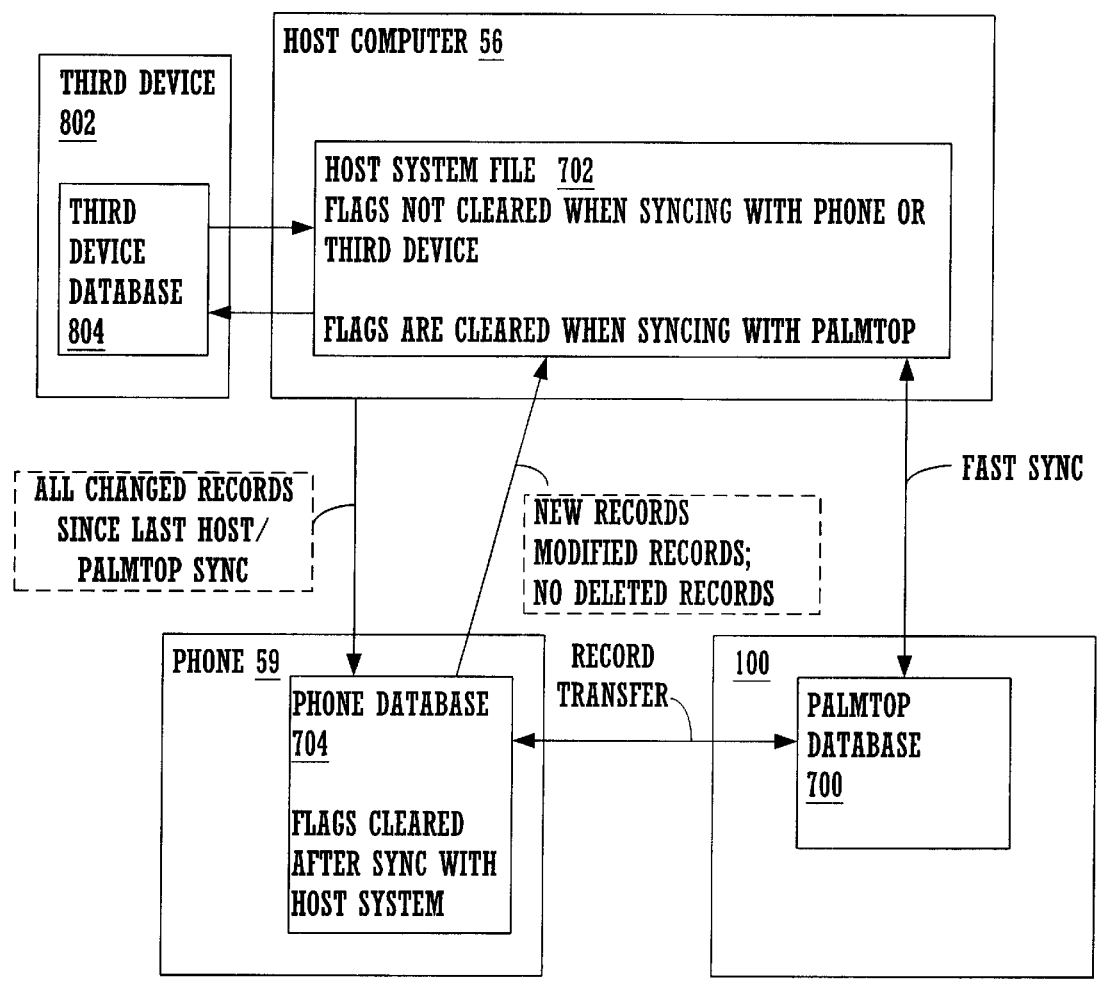
FIG. 8A is a block diagram showing details of synchronization in a multidevice environment according to one embodiment of the present invention.

FIG. 8A shows a block diagram of an embodiment of the present invention which is useful when one device is often used to input records, but changes are not always desired to propagate to that device. In this embodiment, the PDA 100 is a favored device, in that it always does a fast-synchronization with the host system 56. The phone 59 and the third device 802 are secondary devices. When synchronizing with the host system 56, the phone 59 and the third device 802 only transfer new and modified records. Therefore, the synchronization is faster than a slow synchronization, which transfers all records across the communication bus 54 (FIG. 1). Furthermore, only the records on the host system 56 which have changed since the last synchronization with the PDA 100 are transferred to the secondary devices. Thus, the phone 59 and other secondary devices will not be burdened with extra records which could overload their memory or make their databases harder to search through. Furthermore, records which are deleted from a secondary device will not be deleted on another device. As shown, the PDA 100 may exchange records directly with other devices such as the phone 59.

The host system and the PDA 100 use a fast-synchronization. However, unlike the embodiment of FIG. 7C, in which the host system 56 must check to see if the PDA 100 was the last device with which it synchronized (Step 745, FIG. 7), in this embodiment that step is unnecessary. That is because the host's flags are not cleared after synchronizing with other devices and thus the host 56 can always trust its flags to be accurate when synchronizing with the PDA 100.

Figure 8B:
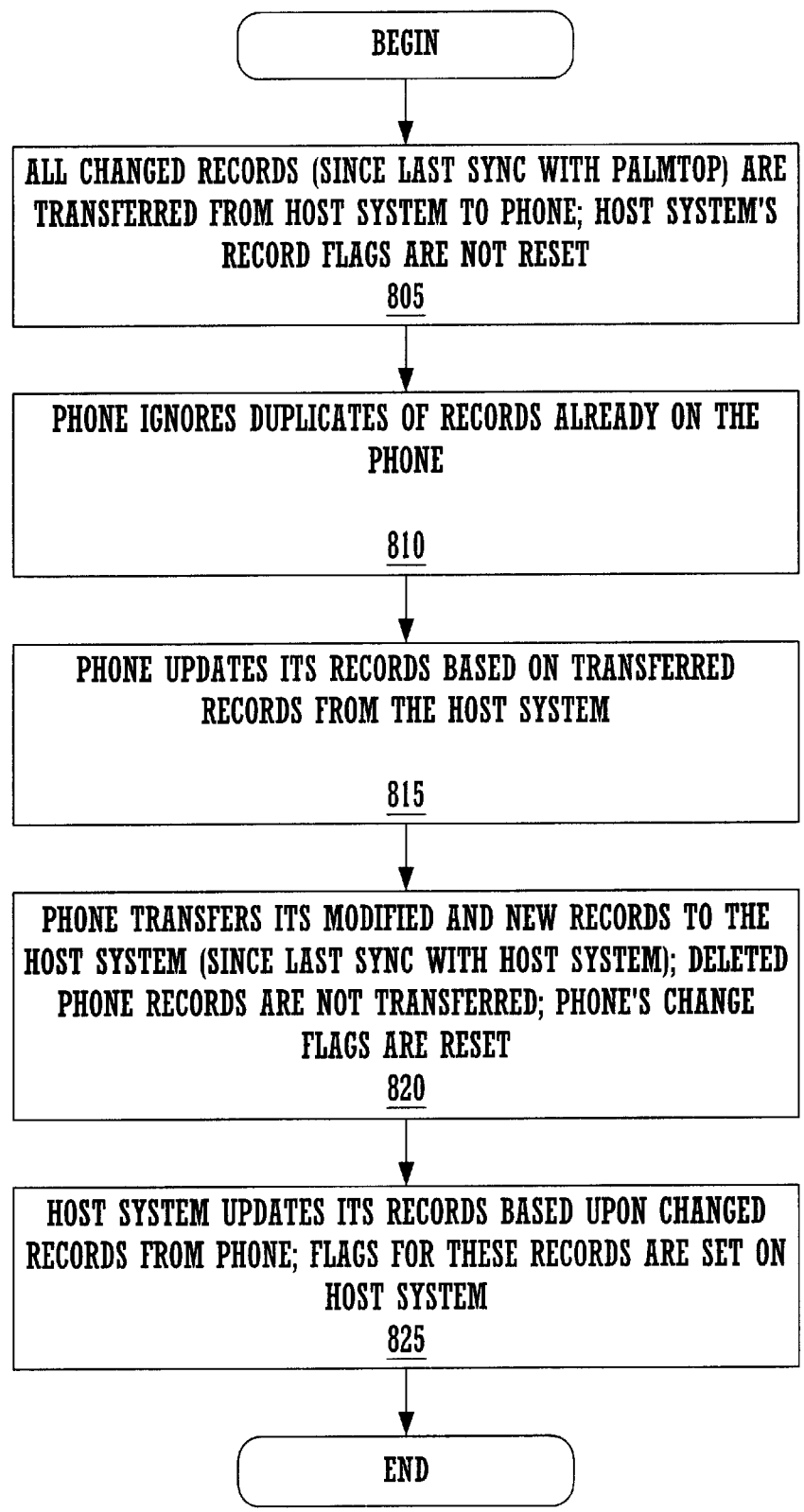
FIG. 8B is a flowchart showing the steps of synchronizing a host system with a phone according to the embodiment shown in FIG. 8A.

Referring now to FIG. 8B, the steps performed when synchronizing a secondary device, such as the phone 59, with the host system 56 will be described. In step 805, all records from the host system 56 which are flagged as changed since the last synchronization with the PDA 100 are sent to the phone 59 (post-synchronization records). The host system's database flags are not cleared. Consequently, the next time the host 56 synchronizes with the PDA 100, the PDA 100 will receive all of the changes made on the host system 56. However, the phone will not receive changes made to the host database 702 before the last synchronization of the host system 56 with the PDA 100. Nor will the phone receive the changes entered to the PDA database 700. Thus, the present invention allows the user to prevent the secondary devices from being overloaded with changes from other devices; however, the user can still add selectively to them by adding changes to the host system 56 and then synchronizing with selected secondary devices before synchronizing with the favored PDA 100.

In step 810, the phone 89 ignores duplicates of records already on the phone 89. These duplicates can be sent down from the host computer 56 if the PDA 100 has not synchronized with the host system 56 since the last time the phone 59 and host system 56 synchronized. In step 815, the phone 89 updates its records based upon the records transferred from the host system 56.

In step 820, all records from the phone database 704 which are flagged as new or modified since the last synchronization with the host system 56 are transferred to the host system 56. Records which have been deleted on the phone 56 are not transferred. That is, the host system 56 is not informed that these records were deleted in the phone database 702. In this fashion, the user may delete records on the phone 59 to save memory or to trim the size of database 702 so that it is easier to review the records in database 702. However, these deletions will not affect the host system 56 or any other device.

In step 825, the host system 56 updates its database 702 based upon the phone's 89 uploaded changes. Additionally, flags corresponding to the changed records are set in the host database 702. In this manner, these changes will be transferred to the favored PDA 100, as well as any device which synchronizes with the host before the favored PDA 100 synchronizes, thus triggering a reset of the host system 56 flags.

Figure 9A:
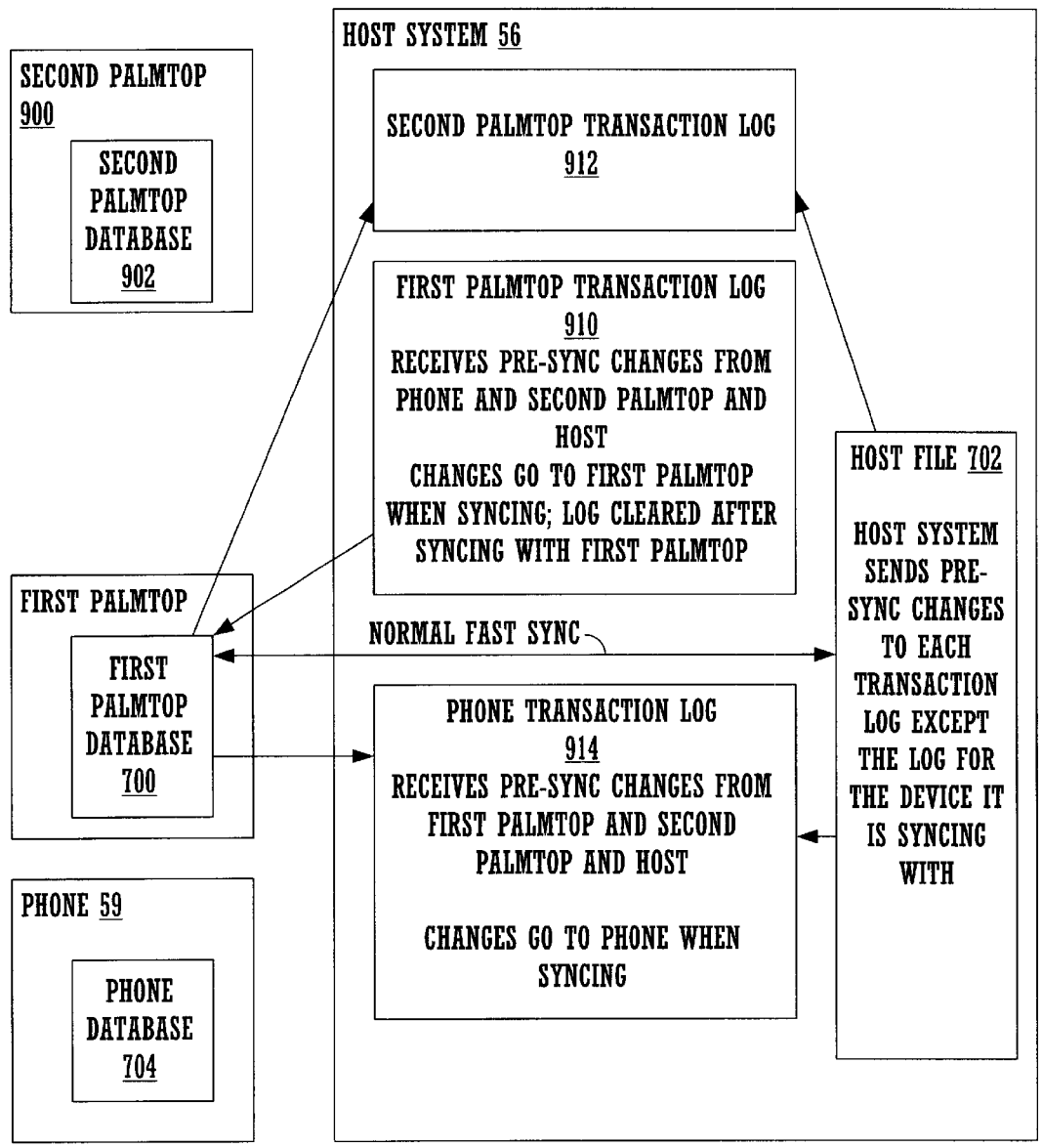
FIG. 9A is a block diagram showing transfers which occur during synchronization, according to an embodiment of the present invention which uses transaction logs.

Referring now to FIG. 9A, an embodiment of the present invention utilizing transaction logs will be described. There is a transaction log (910, 912, 914) for each device (first PDA 100, second PDA 900, phone 59) which may synchronize with the host system 56. Transfers which take place when first PDA 100 synchronizes with the host system 56 are shown in FIG. 9A. It will be borne in mind that transfers during other synchronizations have been left off FIG. 9A so as to not obscure the present invention. First PDA 100 transaction log 910 contains pending changes, which are sent to first PDA 100 when first PDA 100 synchronizes with the host system 56. The changes are added to the transaction log 910 by all other devices (phone 89, second PDA 900) when they synchronize with the host system 56. Additionally, the host system 56 transfers its changes to first PDA transaction log 910 when the other devices (phone 89, PDA 900) synchronize.

This embodiment thus allows a fast synchronization, as only changed records are transmitted between the device and the host system 56. Furthermore, this embodiment does not require a comparison of each record in both databases (e.g., slow synchronization). Additionally, each device is treated equally in this embodiment. The present embodiment is well-suited to operating with any number of devices, each with a transaction log on the host system 56.

Figure 9B:
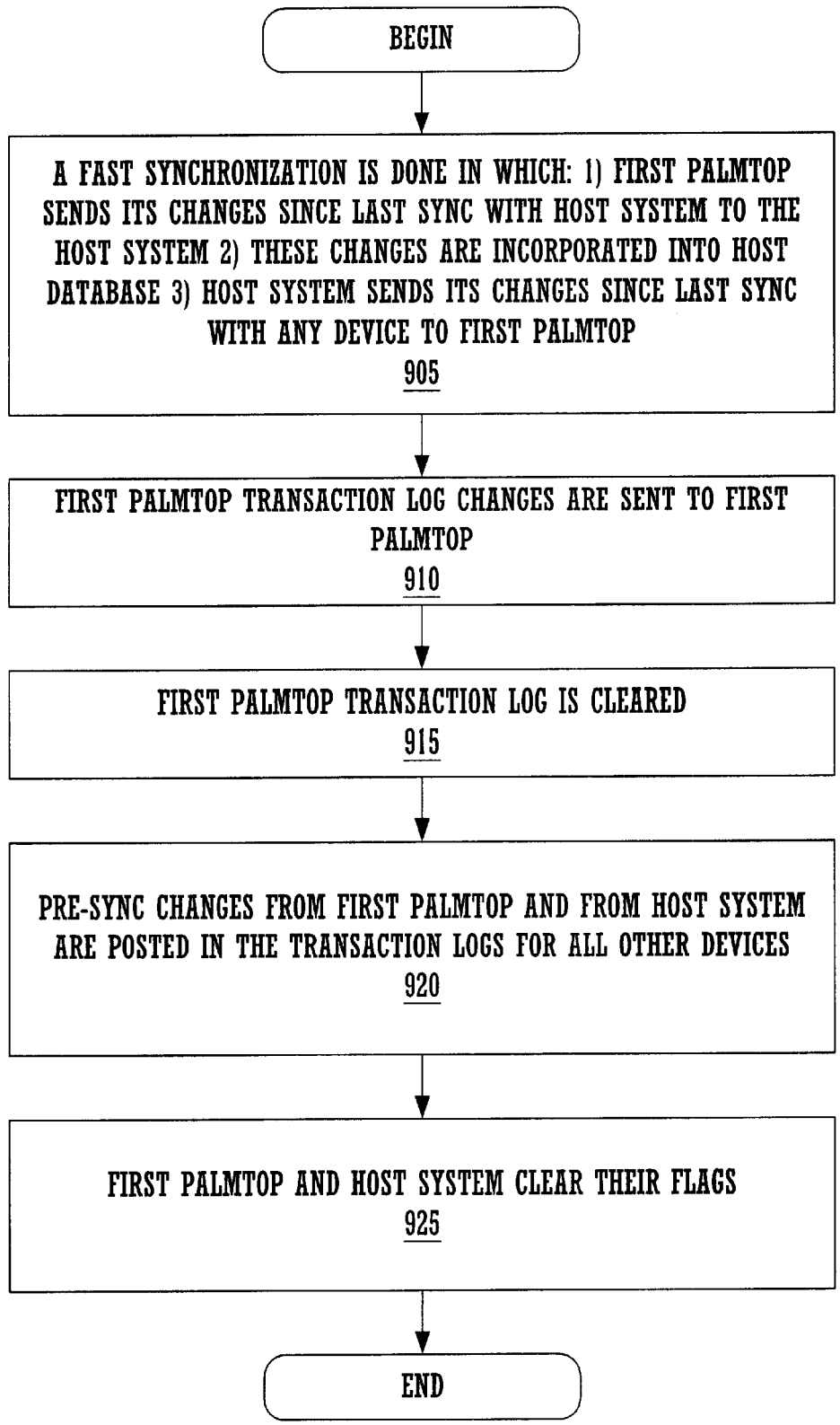
FIG. 9B is a flowchart showing the steps of synchronizing a device with a host system according to the embodiment shown in FIG. 9A.

Referring now to FIG. 9B, the process of synchronizing one device with the host system 56 will be described. In this embodiment, the process for all devices are analogous as all devices are treated equally. In step 905, a normal fast-synchronization is performed, in which: 1) first PDA 100 sends all of its changed records since its last synchronization with the host system 56 to the host system 56; 2) appropriate comparisons are done on the host system 56; 3) changed records are sent to first PDA 100; and 4) the host system database 702 is updated to reflect synchronization changes.

In step 910, the contents of the first PDA's transaction log 910 are sent to the first PDA 100 and are incorporated into the first PDA's database 700. In step 915, the first PDA's transaction log 910 is cleared. Thus, this transaction log 910 is ready to receive fresh changes from other devices, as well as the host system 56 during other device's synchronization.

In step 920, the pre-synchronization changes from first PDA 100 and from the host system 56 are incorporated into all device's transaction logs (phone transaction log 914, second PDA log 912) but the first PDA's transaction log 910. In this fashion, when other devices synchronize, they will receive all changes made by other devices, as well as by the host system 56.

In step 925, the host system 56 and first PDA 100 clear their flags. As both the host system 56 and first PDA 100 have stored their changes in all other device's transaction logs, their changes will be received by those devices when they synchronize with the host system 56.

Figure 10A:
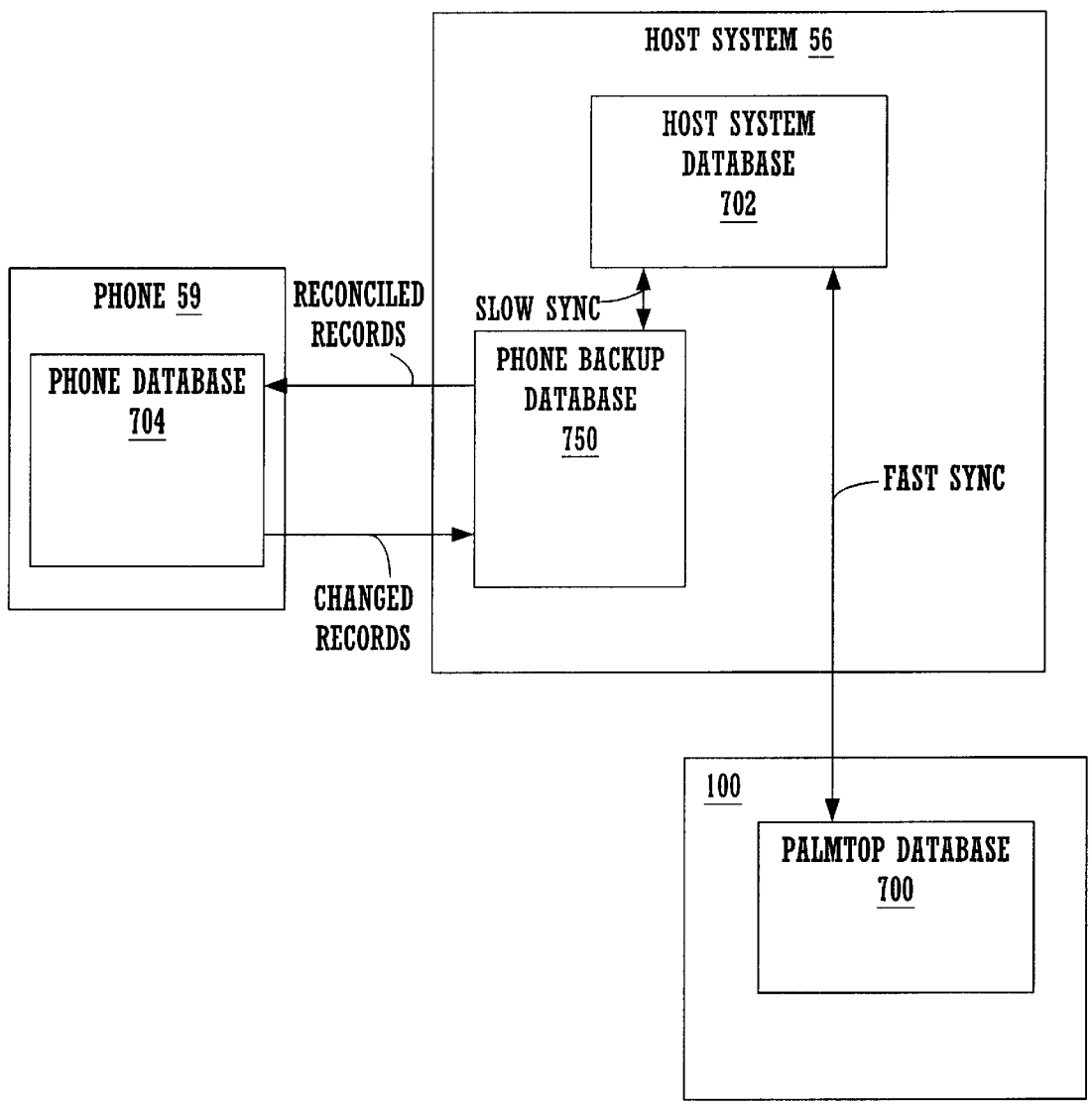
FIG. 10A is a block diagram showing details of transfers which occur during synchronization according to one embodiment of the present invention.

Referring now to FIG. 10A, an embodiment of the present invention which uses a backup database on the host device is described. Changed records from a phone database 704 are sent to the backup database 750 on the host computer system 56. After a slow-synchronization between the backup database 750 and the host database 702, the reconciled data is sent to the phone database 704. In this embodiment, the PDA 100 and the host system 56 utilize a fast-synchronization process.

This embodiment takes advantage of the fast processing speed of today's computers when doing the slow synchronization. Furthermore, by only sending changed records, as opposed to the entire database, connection time is saved, which is especially advantageous when using a wireless connection.

Figure 10B:
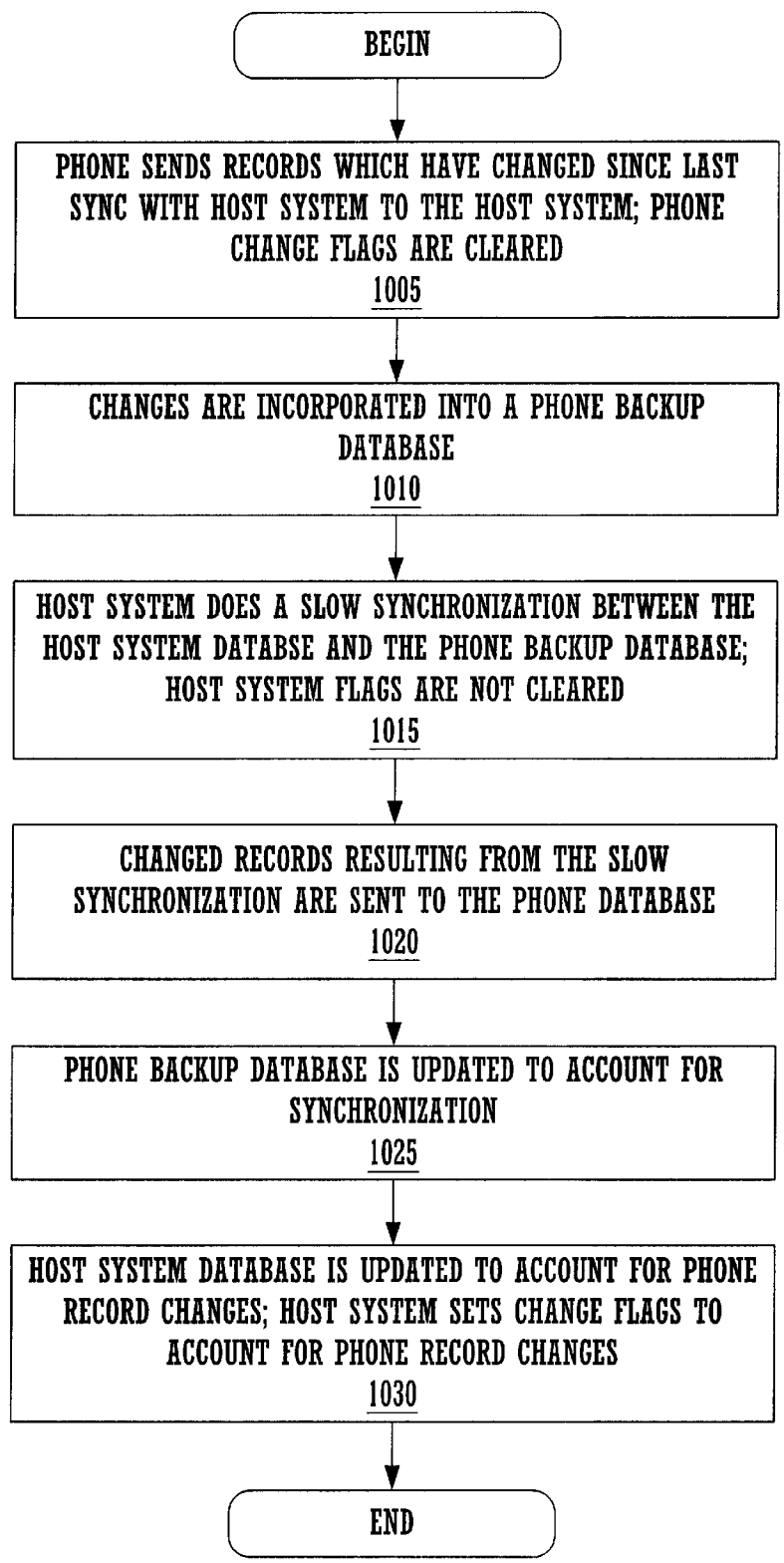
FIG. 10B is a flowchart showing the steps of synchronizing a device to a host system according to the embodiment of the present invention shown in FIG. 10A.

Referring now to FIG. 10B, the steps of synchronizing the phone 59 with the host system 56 will be described. In step 1005, the phone 59 transfers only records which have changed since the last synchronization with the host system 56. Additionally, the phone 59 clears the change flags in its database 704.

In step 1010, the transferred records are incorporated into the backup database 750, which had the result of the last synchronization between the phone 59 and the host system 56. Therefore, the phone backup database 750 will now be a mirror image of the phone database 704.

In step 1015, a slow-synchronization (record-by-record comparison) is performed between the phone backup database 750 and the host database 702. This process creates reconciled records. The host database flags are not cleared after this step. Consequently, when performing a later synchronization with the PDA 100, all changes will get to the PDA 100. Thus, it will appear to the PDA 100 that all changes originated on the host system 56.

In step 1020, the reconciled records are sent to the phone database 704 on the phone 89. In step 1025, the phone backup database 750 is updated with these changes. In this manner, the phone backup database 750 now mirrors the phone database 704 and is prepared for the next synchronization process.

In step 1030, the host system database 702 is updated to account for the synchronization changes. Additionally, flags are set in the host database 702, so that these changes will be sent to the PDA 100 when it synchronizes with the host system 56.

The preferred embodiment of the present invention, a system for allowing multiple devices to synchronize their databases without the need for a single mass synchronization, is thus described. While the present invention has been described in particular embodiments, it should be appreciated that the present invention should not be construed as limited by such embodiments, but rather construed according to the below claims.

What is claimed is:

1. A system for sharing information comprising:
   a host computer system having a first version of a database stored thereon;
   a portable computer system having a second version of said database stored thereon, wherein said portable computer system and said host computer system perform a fast synchronization wherein change flags are used to determine record updates; and
   a portable electronic device having a third version of said database stored thereon, where said host computer system and said portable electronic device perform a slow synchronization wherein records of said first and third version of said database are compared against each other to determine record updates.

2. A system for sharing information as described in claim 1 wherein said portable electronic device and said portable computer system perform synchronization wherein only records that have changed since the last time each device synchronized to said host computer are involved and wherein no change flags are cleared and duplicate records are ignored.

3. A system for sharing information as described in claim 1 wherein said portable electronic device is a cellular phone.

4. A system for sharing information as described in claim 1 wherein said portable electronic device is a pager device.

5. A system for sharing information as described in claim 1 wherein said portable computer system is a personal digital assistant (PDA).

6. A system for sharing information as described in claim 1 wherein said portable electronic device has changes flags that are reset after said slow synchronization with said host computer system.

7. A system for sharing information comprising:
   a host computer system having a first version of a database stored thereon;
   a portable computer system having a second version of said database stored thereon, wherein said portable computer system and said host computer system perform a fast synchronization wherein change flags are used to determine record updates; and
   a portable electronic device having a third version of said database stored thereon, where said host computer system and said portable electronic device perform a synchronization wherein all records of said first version of said database which have changed since the most recent said fast synchronization with said portable computer system are compared with new and modified records of said third version of said database to determine record updates and wherein change flags on said portable electronic device are cleared and change flags on said host computer system are not cleared.

8. A system for sharing information as described in claim 7 wherein said portable electronic device is a cellular phone.

9. A system for sharing information as described in claim 7 wherein said portable electronic device is a pager device.

10. A system for sharing information as described in claim 7 wherein said portable computer system is a personal digital assistant (PDA).

11. A system for sharing information as described in claim 7 wherein said portable electronic device is a personal digital assistant (PDA).

12. A system for sharing information as described in claim 7 wherein records added to said first version of said database since the most recent said fast synchronization are not transferred to said portable electronic device during said synchronization between portable electronic device and said host computer system.

13. A system for sharing information as described in claim 7 wherein records deleted from said third version of said database are not compared with said records of said first version of said database which have changed since the most recent said fast synchronization during said synchronization between portable electronic device and said host computer system.

14. A system for sharing information comprising:
- a host computer system having a host version of a database and a first and a second transaction log stored thereon, said first and said second transaction logs for containing first pending changes and second pending changes to be sent respectively to a first and a second portable electronic device;
- said first portable electronic device having a first version of said database stored thereon, wherein said first portable electronic device and said host computer system perform a fast synchronization wherein change flags are used to determine record updates, and wherein said first portable electronic device receives said first pending changes from said first transaction log; and
- said second portable electronic device having a second version of said database stored thereon, wherein said second portable electronic device and said host computer system perform a fast synchronization wherein change flags are used to determine record updates, and wherein said second portable electronic device receives said second pending changes from said second transaction log.

15. A system for sharing information as described in claim 14 wherein said first portable electronic device is a cellular phone.

16. A system for sharing information as described in claim 14 wherein said second portable device is a personal digital assistant (PDA).

17. The system of claim 14 further comprising:
- a third transaction log on said host system, said third transaction log for containing pending changes for a third portable electronic device; and
- said third portable electronic device having a third version of said database stored thereon, wherein said third portable electronic device and said host computer system perform a fast synchronization wherein change flags are used to determine record updates and said third portable electronic device receives changes from said third transaction log.

18. The system of claim 14 wherein:
- said first transaction log is further for receiving pre-synchronization changes from said host computer system and from said second portable electronic device; and
- said second transaction log is further for receiving pre-synchronization changes from said host computer system and from said first portable electronic device.

19. A system for sharing information comprising:
- a host computer system having a first version of a database and a backup database stored thereon;
- a portable computer system having a second version of said database stored thereon, wherein said portable computer system and said host computer system perform a fast synchronization wherein change flags are used to determine record updates; and
- a portable electronic device having a third version of said database stored thereon and for sending only changed records to said host computer system, said backup database for receiving said changed records from said third version of said database such that said backup database mirrors said third version of said database, wherein said host computer system and said backup database perform a slow synchronization wherein records of said backup database and said first version of said database are compared against each other to determine record updates.

20. A system for sharing information as described in claim 19 wherein said portable electronic device is a cellular phone.

21. A system for sharing information as described in claim 19 wherein said portable electronic device is a pager device.

22. A system for sharing information as described in claim 19 wherein said portable computer system is a personal digital assistant (PDA).

23. A system for sharing information as described in claim 19 wherein said third version of said database receives reconciled records from the result of said slow synchronization between said backup database and said first version of said database.

* * * * *